US006711743B1

(12) United States Patent
Hong et al.

(10) Patent No.: US 6,711,743 B1
(45) Date of Patent: Mar. 23, 2004

(54) METHOD AND APPARATUS FOR IMPROVEMENT IN SET-TOP BOX NETWORK PERFORMANCE

(75) Inventors: Yan Hong, San Jose, CA (US); Takahiro Fujimori, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 744 days.

(21) Appl. No.: 09/664,495

(22) Filed: Sep. 18, 2000

(51) Int. Cl.[7] .............................................. H04N 7/173

(52) U.S. Cl. ...................... 725/111; 725/110; 725/124; 725/131; 725/151

(58) Field of Search ................................ 725/109, 110, 725/111, 124, 125, 112, 113, 131, 139, 154; 455/557

(56) References Cited

U.S. PATENT DOCUMENTS

| | | | | |
|---|---|---|---|---|
| 5,488,412 A | * | 1/1996 | Majeti et al. | 725/111 |
| 5,585,838 A | | 12/1996 | Lawler et al. | |
| 5,608,446 A | * | 3/1997 | Carr et al. | 725/114 |
| 5,630,204 A | | 5/1997 | Hylton et al. | |
| 5,633,891 A | | 5/1997 | Rebec et al. | |
| 5,654,748 A | | 8/1997 | Matthews, III | |
| 5,758,258 A | | 5/1998 | Shoff et al. | |
| 5,793,413 A | | 8/1998 | Hylton et al. | |
| 5,894,479 A | * | 4/1999 | Mohammed | 370/401 |
| 5,951,650 A | | 9/1999 | Bell et al. | |
| 5,991,596 A | | 11/1999 | Cunningham et al. | |
| 6,016,388 A | | 1/2000 | Dillon | |
| 6,040,851 A | | 3/2000 | Cheng et al. | |
| 6,052,750 A | | 4/2000 | Lea | |
| 6,240,553 B1 | * | 5/2001 | Son et al. | 725/95 |
| 6,421,728 B1 | * | 7/2002 | Mohammed et al. | 709/227 |
| 6,483,870 B1 | * | 11/2002 | Locklear et al. | 375/222 |
| 6,484,210 B1 | * | 11/2002 | Adriano et al. | 709/239 |
| 2002/0083466 A1 | * | 6/2002 | Ina | 725/121 |
| 2002/0108119 A1 | * | 8/2002 | Mao et al. | 725/109 |

OTHER PUBLICATIONS

"Set–Top Boxes Flex Their Muscles with Programmable Processors", Dave Bursky, Electronic Design, Apr. 19, 1999.

* cited by examiner

*Primary Examiner*—John Miller
*Assistant Examiner*—Nathan A Sloan
(74) *Attorney, Agent, or Firm*—Miller Patent Services; Jerry A. Miller

(57) ABSTRACT

A method and apparatus of enhancing communications in a set-top box having a high speed modem and a lower speed modem. A selected one of the modems can be used, depending upon noise and speed considerations, to receive a response packet by selectively substituting the appropriate IP address as the source address in a request message.

51 Claims, 5 Drawing Sheets

SERVER
112
REQUEST
340
RESPONSE
350
IP ADDRESS B OUT OF BAND (OOB) MODEM (1.5 MBPS)
108
IP ADDRESS A DOCSIS CABLE MODEM (42 MBPS)
104
SET TOP BOX
100
MEMORY / STORAGE
124
PROCESSOR
118
130
DESTINATION IP SERVER
142
SOURCE IP ADDRESS A
346
DATA
148
340
DESTINATION IP ADDRESS A
352
SOURCE ADDRESS IP SERVER
156
DATA
158
350

SERVER
112
RESPONSE
450
REQUEST
440
SET TOP BOX
100
IP ADDRESS B OUT OF BAND (OOB) MODEM (1.5 MBPS)
108
IP ADDRESS A DOCSIS CABLE MODEM (42 MBPS)
104
MEMORY / STORAGE
124
PROCESSOR
118
130
DESTINATION IP SERVER
142
SOURCE IP ADDRESS B
446
DATA
148
440
DESTINATION IP ADDRESS B
452
SOURCE ADDRESS IP SERVER
156
DATA
158
450

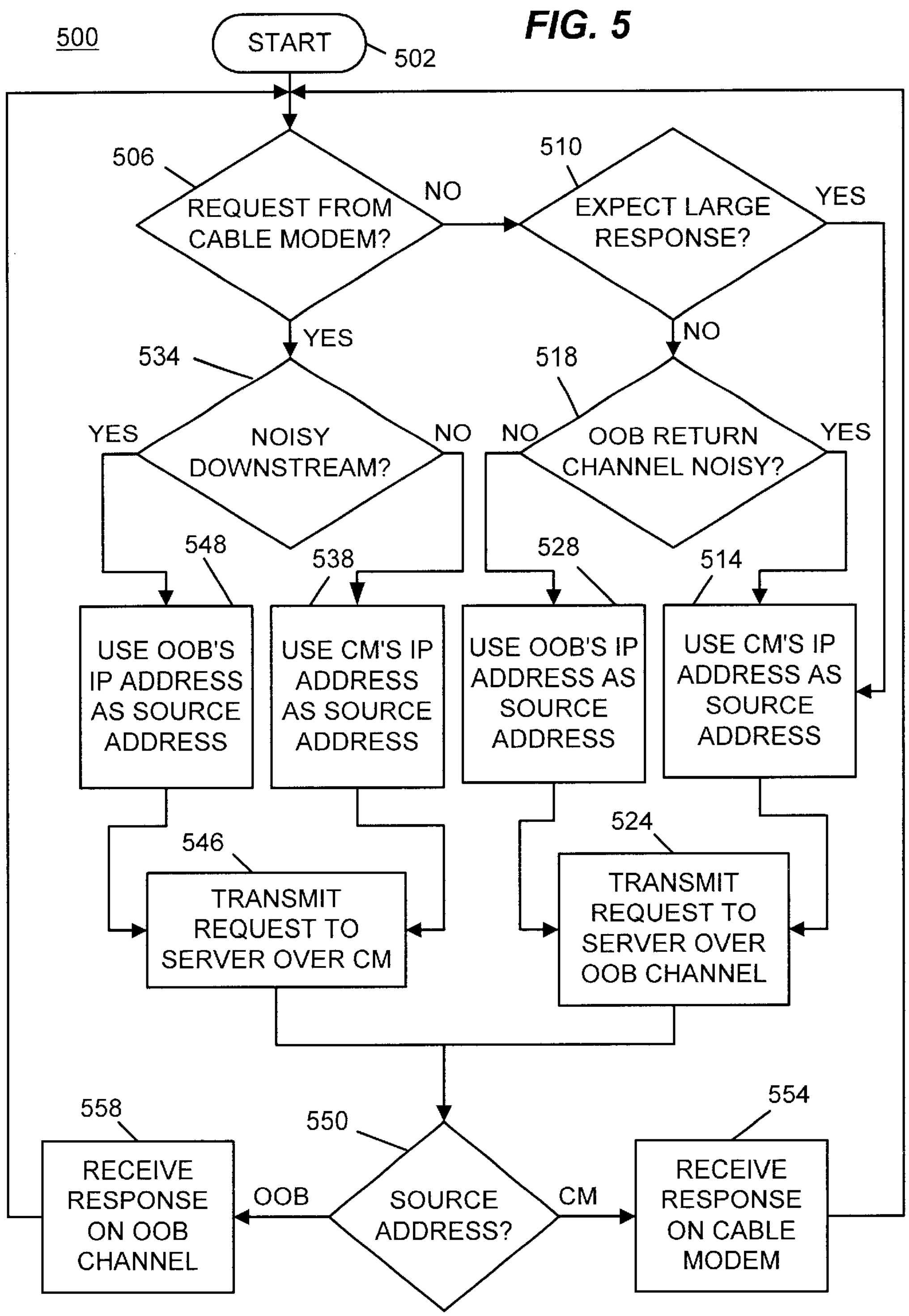
FIG. 5
500
START
502
506
REQUEST FROM CABLE MODEM?
NO
510
EXPECT LARGE RESPONSE?
YES
YES
534
NOISY DOWNSTREAM?
YES
NO
NO
518
OOB RETURN CHANNEL NOISY?
NO
YES
548
USE OOB'S IP ADDRESS AS SOURCE ADDRESS
538
USE CM'S IP ADDRESS AS SOURCE ADDRESS
528
USE OOB'S IP ADDRESS AS SOURCE ADDRESS
514
USE CM'S IP ADDRESS AS SOURCE ADDRESS
546
TRANSMIT REQUEST TO SERVER OVER CM
524
TRANSMIT REQUEST TO SERVER OVER OOB CHANNEL
558
RECEIVE RESPONSE ON OOB CHANNEL
550
SOURCE ADDRESS?
OOB
CM
554
RECEIVE RESPONSE ON CABLE MODEM

METHOD AND APPARATUS FOR IMPROVEMENT IN SET-TOP BOX NETWORK PERFORMANCE

FIELD OF THE INVENTION

This invention relates generally to the field of set-top boxes for cable or satellite television systems. More particularly, this invention relates to a method and apparatus for improvement in network performance of set-top boxes.

BACKGROUND OF THE INVENTION

Television set-top boxes such as those used in conjunction with cable television and satellite television systems often include two modems. In the case of cable television set-top boxes, often a DOCSIS cable modem and an out-of-band (OOB) modem are provided. The DOCSIS modem commonly operates at speeds up to 42 MBPS, whereas the out-of-band modem operates at a much slower but more reliable speed of perhaps 1.5 MBPS. When using the slower out-of-band modem, it may take a substantial amount time to carry out large downloads of information. Also, under high noise conditions, the cable modem may suffer high error rates producing unreliable or slow communications.

SUMMARY OF THE INVENTION

The present invention relates generally to set-top boxes. Objects, advantages and features of the invention will become apparent to those skilled in the art upon consideration of the following detailed description of the invention.

In one embodiment of the present invention, a method and apparatus of enhancing communications in a set-top box having a high speed modem and a lower speed modem uses selection of one of the modems depending upon noise and speed considerations, to receive a response packet by selectively substituting the appropriate IP address as the source address in a request message.

A method of communication in a set-top box having a high speed modem and a comparatively lower speed modem consistent with embodiments of the present invention includes transmitting a first request from the lower speed modem, the request including an IP address for the lower speed modem as a source address; determining that a reply to the first request is greater in size than a threshold size; and transmitting a second request from the lower speed modem using an IP address of the high speed modem for the source address.

A method of communication in a set-top box having a high speed modem and a comparatively lower speed modem consistent with another embodiment of the invention includes: transmitting a first request from the lower speed modem, the request including an IP address for the lower speed modem as a source address; determining that a communication channel used by the lower speed modem is noisy; and transmitting a second request from the lower speed modem using an IP address of the high speed modem for the source address.

A method of communication in a set-top box having a high speed modem and a comparatively lower speed modem consistent with yet another embodiment of the invention includes: transmitting a first request from the high speed modem, the request including an IP address for the high speed modem as a source address; determining that a communication channel used by the high speed modem is noisy; and transmitting a second request from the high speed modem using an IP address of the lower speed modem for the source address.

Any or all of the above methods can be implemented in a programmed processor residing within a set-top box. Moreover, a storage medium can carry instructions to implement the above process in a programmed processor residing in a set-top box. Additionally, a computer program embodying instructions to carry out the above process can be transmitted over any suitable communication medium.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 5 is a flow chart of a process consistent with embodiments of the present invention.

DETAILED DESCRIPTION OF THE INVENTION

Figure 1:
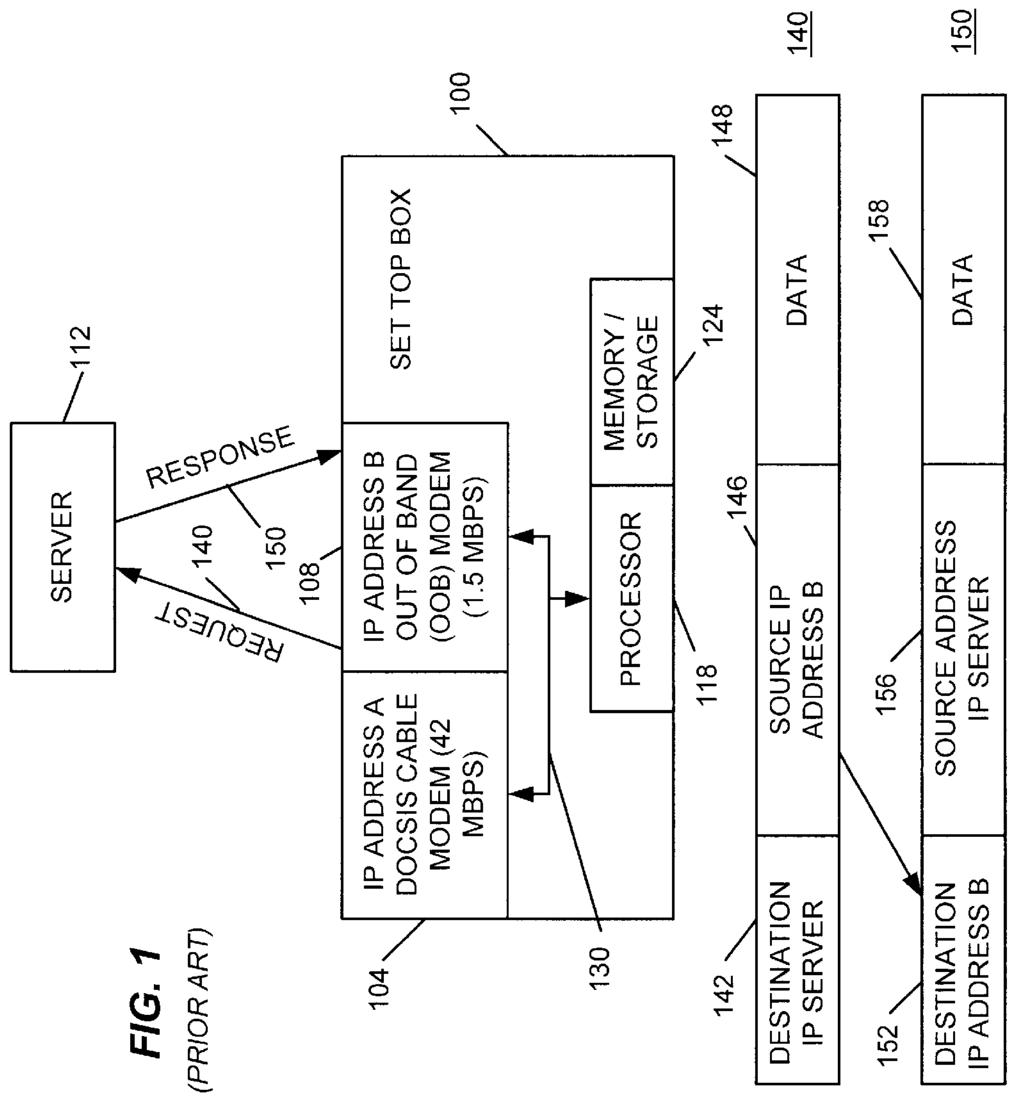
FIG. 1 is a diagram illustrating a first potential communication problem encountered with set-top boxes.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Turning now to FIG. 1, a set-top box (STB) 100 is illustrated including a pair of modems suitable for communication using a cable television system. The first modem is a high speed modem and is referred to herein as a cable modem (CM) 104 which may conform to the ITU's DOCSIS (Data Over Cable Service Interface Specification) cable modem standard. Under this standard, currently the modem may operate at baud rates of up to 42 MBPS. However, this should not be considered limiting. A second, comparatively lower speed modem 108, such as an out-of-band (OOB) modem 108 operates, in this embodiment, at up to approximately 1.5 MBPS, but this too should not be considered limiting. In relative terms, the present invention is applicable to set-top boxes and other systems using two modems wherein one can be considered high speed in relation to the other. Thus, for purposes of this document "high" speed means higher than the lower speed modem, and "lower" speed means lower than the high speed modem. The absolute speed differences are irrelevant. By way of one example, the relative speeds of the two modems can be, for example, at least a factor of two different, with the higher speed modem considered to fall within the meaning of the term "high speed modem" herein. Unfortunately, along with the higher speed, comes somewhat greater vulnerability to noise, so that the lower speed modem can typically communicate more reliably, albeit slower, than the higher speed modem.

Set-top box 100 communicates via modems 104 and 108 with a server 112 over a suitable electronic communication medium. In the case of a cable television system, the communication medium constitutes the cable system itself, however, in other communication environments, wireless and satellite communications, telephone lines and/or fiber optics can constitute one or more of the communication media used by one or more of the modems of the set-top box 100.

Set-top box 100, in the preferred embodiment, also includes a processor 118 implemented, for example, as a microprocessor or microcontroller. Set-top box 100 also includes memory and/or mass storage such as Random Access Memory (RAM), Read Only Memory (ROM), flash memory, hard disc storage, etc. designated as 124. Memory 124 stores an operating system such as the Sony Aperios™ operating system as well as data and computer programs such as a browser and control programs for controlling operation of the set-top box 100 including modems 104 and 108. Processor 118 communicates with other devices including modems 104 and 108 residing within the set-top box 100 via a communication bus 130 in a conventional manner.

FIG. 1, illustrates a problem that can occur in communication with server 112 using the OOB relatively lower speed modem 108. In this example, when a request 140 is transmitted from the OOB modem 108, it communicates using a protocol such as Internet Protocol (IP). In this protocol and similar ones, the request message includes a destination address 142 for the message's destination server 112, a source address 146 informing the destination of the IP address of the source (in this case IP address B—the IP address of the OOB modem) and data 148 forming the actual request. Such requests might be for download of information or updates of software, etc. At the destination server 112, the response or reply 150 is assembled and transmitted back to the set-top box 100. In so doing, the destination server 112 uses the source address 146 as the destination address 152 for the response. The reply similarly uses the IP address of the server 112 as the source address 156 and includes data 158 forming the actual reply or response. These messages, both 140 and 150 are typically broken into many smaller packets having similar format for communication over the network.

The operation described above follows conventional IP communication protocol. A problem occurs when the response message is extremely large. For example, in this case, if the reply message is 80 MB in size, it will take at least approximately 53 seconds to receive under best conditions, and typically longer.

Figure 2:
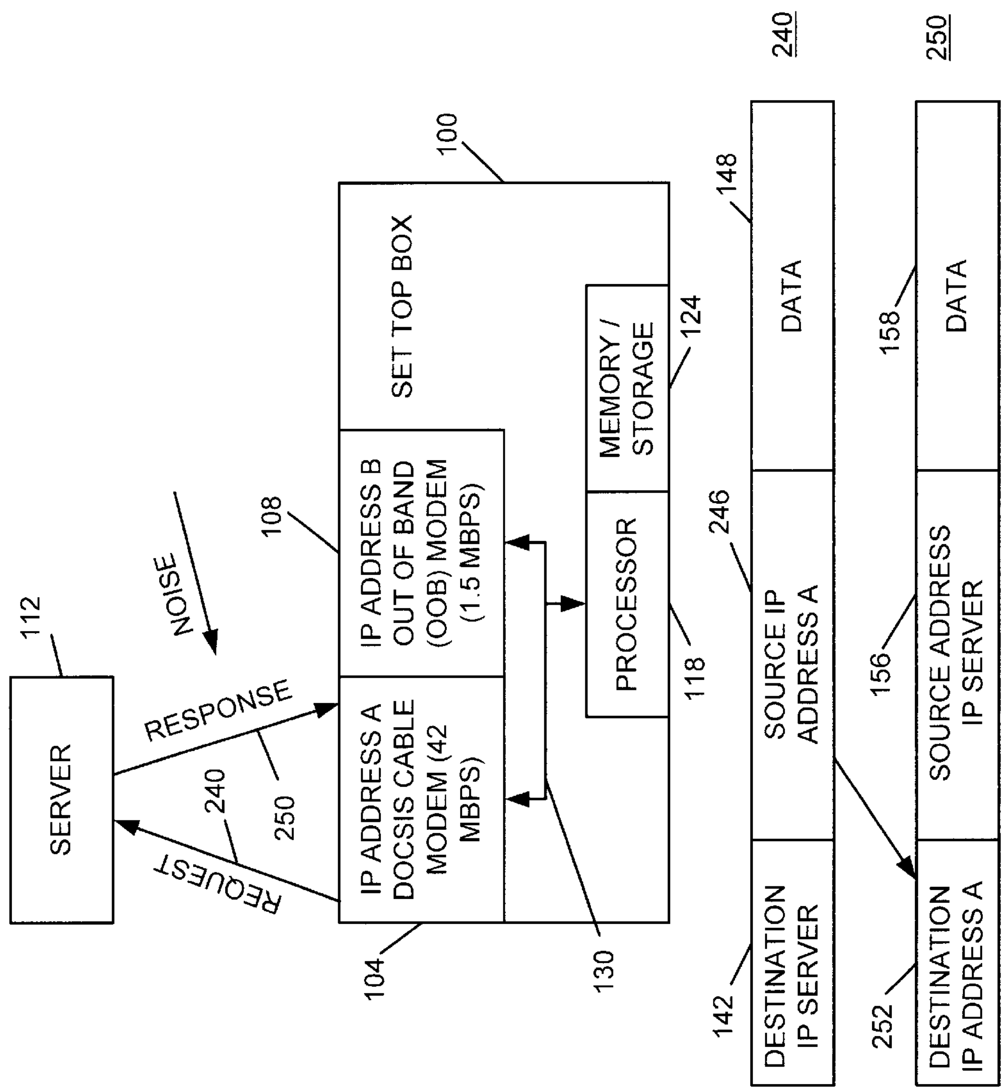
FIG. 2 is a diagram illustrating a second potential communication problem encountered with set-top boxes.

Another scenario is illustrated in FIG. 2, wherein the cable modem 104 initiates a request 240 to server 112, and the response 250 is returned under high noise conditions. The request message 240, in accord with Internet Protocol, includes the destination address 142 of the server 112 and the source address 246 of the cable modem (address A) along with data 148. The reply message 250 uses the source address 246 as the destination address 252 along with the source address 156 of the server 112 and the data 158.

Under high noise circumstances, errors generated by the noisy conditions in the downstream cable modem communication channel can cause the response message 250 to be garbled and filled with errors. Such errors necessitate retransmission of response packets slowing down the response and possibly rendering it unreliable or even useless.

The problem described in connection with FIG. 1 can be ameliorated using the technique illustrated in FIG. 3. In this embodiment, upon determining that a request is likely to or will result in a large reply message 350, the OOB modem 108, operating under control of the programmed processor 118, transmits the request 340 with the IP address of the higher speed cable modem as the source address at 346. As a result, subsequent response messages 350 will use the source address 346 (A) of the cable modem 104 as the destination address 352. Thus, when the response message is large enough, the response can be elicited to be received on the higher speed cable modem 104. The processor 118 can determine that a message is "large" by examining the first packet received in the response from the server 112. This packet will indicate how large the total response is. The size of the response can therefore be ascertained and compared with a threshold. If the size of the response exceeds the threshold, the response is deemed to be large. At this point, the Out-of-band modem 104 cancels the initial request and transmits request 340 substituting the cable modem's address as 346 for the source address. Thus, the server, in accordance with standard Internet protocol, will use the cable modem address as the destination address for response message 350. Using this technique, the receipt of an 80 MB response can take place in as little as approximately 2 seconds.

The threshold used in the above process can be determined based upon the relative speeds of the two modems and perceived acceptable download time for larger files. Other techniques can also be used without limitation to establish a suitable threshold.

Figure 4:
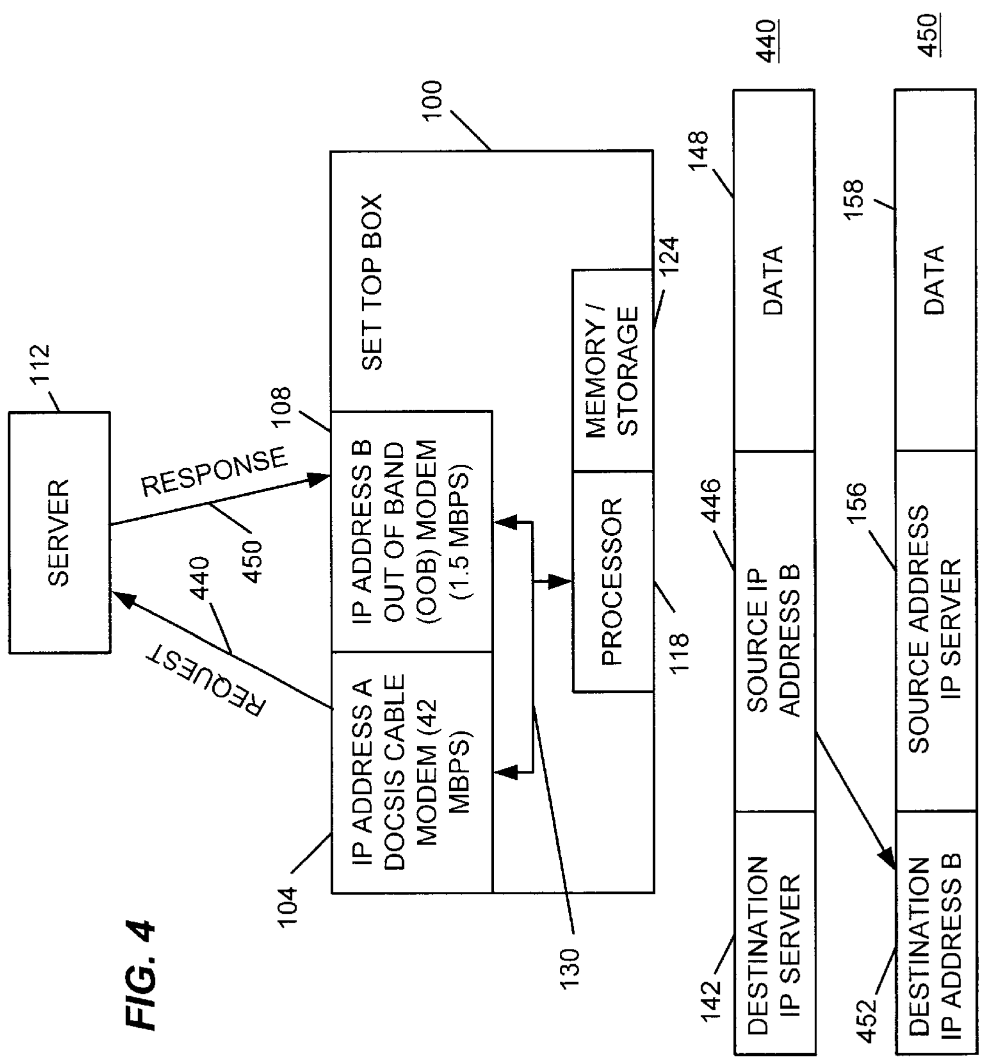
FIG. 4 is a diagram illustrating a solution to the potential problem of FIG. 2.

The problem described in conjunction with FIG. 2 can similarly be addressed using the scenario illustrated in FIG. 4. In the scenario of FIG. 2, a noisy downstream channel delivering data to cable modem 104 is the source of the problem. To address this problem, a request packet 440 is transmitted from the cable modem 104 to server 112. Request packet 440 includes the server's address as the destination address at 142, but includes the OOB modem address B as the source address at 446. Thus, when the response is generated at server 112, response message 450 uses the IP address B of the out-of-band modem 108 at 452 as the destination IP address. In this manner, the noisy downstream channel of the cable modem is avoided in favor of the more reliable out-of-band channel.

The detection of a noisy channel can be accomplished under this scenario by examining reply packets being returned to the cable modem 104 as a result of a request. Alternatively, the presence of a noisy channel can be determined by examining recently received packets arriving at the cable modem 104. Errors can be detected by examining IP check sums for errors or by examining the reply packets for MAC CRC errors. Upon detection of errors by virtue of examining reply packets for IP checksum for errors, or by examining the reply packets for MAC CRC errors, the channel can be deemed too noisy if the error rate exceeds a predetermined threshold error rate. The error threshold can be determined empirically based upon the relative speeds of the two modems and typical error rates encountered in practice, for example. Other techniques for establishing the threshold can also be used without limitation.

Figure 3:
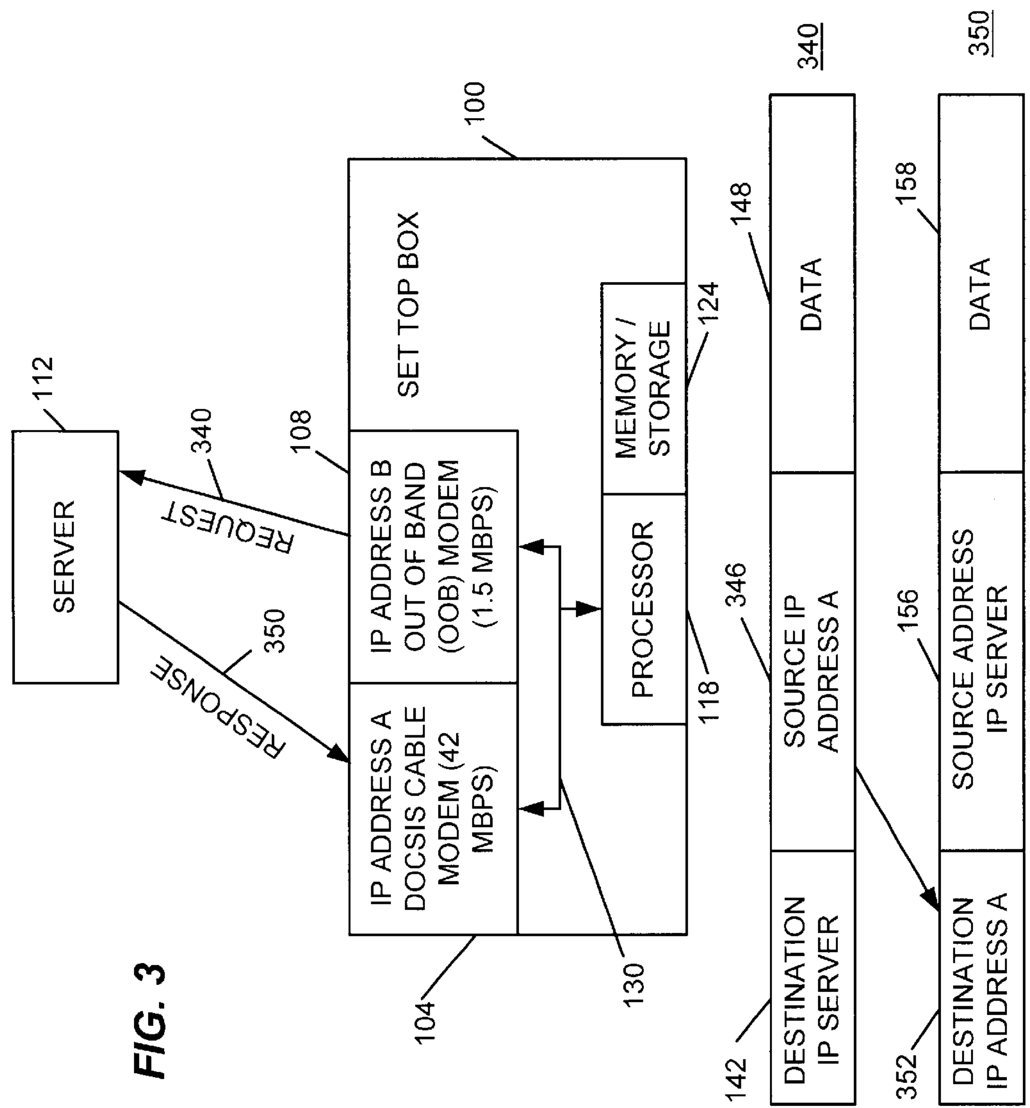
FIG. 3 is a diagram illustrating a solution to the potential problem of FIG. 1.

The processes described in conjunction with FIGS. 3 and 4 are described in greater detail in conjunction with FIG. 5. FIG. 5 illustrates a process 500 starting at 502. When a request is to be transmitted, the process first determines if the requests from the cable modem at 506. If not, the request must be from the out-of-band modem. If the request is not from the cable modem at 506, the process next determines if a large response is anticipated at 510. If a large response is expected at 510, the cable modem's IP address is used as the source address at 514, and the request is transmitted to the server over the out-of-band channel at 524. In the event a large response packet is not anticipated at 510, the process determines at 518 if the out-of-band return channel is noisy. If so, control passes to 514 where the cable modem's IP address is used as the source address prior to transmission at 524 over the out-of-band channel. If the out-of-band channel is not noisy at 518, the out-of-band modem's IP address is used as the source address at 528 and the request is transmitted at 524 to the server over the out-of-band channel.

In the event the request is from the cable modem at 506, the process determines at 534 if the downstream channel for the cable modem is noisy. If not, the cable modem's IP address is used as the source address at 538 and the request is transmitted to the server over the cable modem at 546. In the event the downstream channel is deemed noisy by exceeding a predetermined error threshold at 548, the out-of-band modem's IP address is used as the source address at 548 prior to transmission of the request to the server 112 over the cable modem 104 at 546.

In either case, control passes from 524 or 546 to 550 where, depending upon the source address (cable modem or out-of-band modem) the response is received either on the cable modem at 554 or the out-of-band modem at 558 before control returns to the start.

The program instructions for carrying out the process described are stored in the electronic storage medium 124 within the set-top box 100. The program instructions can also be downloaded to the STB 100 as a software update via a suitable communication transport medium (e.g. the cable or a satellite link or telephone line link) in a known manner.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

Furthermore, the present invention is preferably implemented using a programmed processor executing programming instructions that are broadly described above in flow chart form as well as graphical depictions in FIGS. 3–4. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of communication in a set-top box having a high speed modem and a comparatively lower speed modem, and a processor comprising:

transmitting a first request from the lower speed modem to a server, the request including an IP address for the lower speed modem as a source address;

determining by the processor that a reply to the first request is greater in size than a threshold size; and transmitting a second request from the lower speed modem the server using an IP address of the high speed modem for the source address.

2. The method according to claim 1, further comprising receiving a reply to the second request over the high speed modem.

3. The method according to claim 1, wherein the high speed modem comprises a DOCSIS cable modem.

4. The method according to claim 1, wherein the lower speed modem comprises an out-of-band modem.

5. The method according to claim 1, wherein the processor comprises a programmed processor.

6. A method of communication in a set-top box having a high speed modem and a comparatively lower speed modem, and a processor comprising:

transmitting a first request from the lower speed modem to a sever, the request including an IP address for the lower speed modem as a source address;

determining by the processor that a communication channel used by the lower speed modem is noisy; and transmitting a second request from the lower speed modem to the server using an IP address of the high speed modem for the source address.

7. The method according to claim 6, further comprising receiving a reply to the second request over the high speed modem.

8. The method according to claim 6, wherein the high speed modem comprises a DOCSIS cable modem.

9. The method according to claim 6, wherein the lower speed modem comprises an out-of-band modem.

10. The method according to claim 6, wherein determining that the communication channel used by the lower speed modem is noisy is carried out by examining a reply to the first request for IP checksum for errors.

11. The method according to claim 6, wherein determining that the communication channel used by the lower speed modem is noisy is carried out by examining a reply to the first request for MAC CRC errors.

12. The method according to claim 6, wherein the processor comprises a programmed processor.

13. A method of communication in a set-top box having a high speed modem and a comparatively lower speed modem, and a processor, comprising:

transmitting a first request from the high speed modem to a server, the request including an IP address for the high speed modem as a source address;

determining by the processor that a communication channel used by the high speed modem is noisy; and transmitting a second request from the high speed modem to the server using an IP address of the lower speed modem for the source address.

14. The method according to claim 13, further comprising receiving a reply to the second request over the lower speed modem.

15. The method according to claim 13, wherein the high speed modem comprises a DOCSIS cable modem.

16. The method according to claim 13, wherein the lower speed modem comprises an out-of-band modem.

17. The method according to claim 13, wherein determining that the communication channel used by the high speed modem is noisy is carried out by examining a reply to the first request for IP checksum for errors.

18. The method according to claim 13, wherein determining that the communication channel used by the high speed modem is noisy is carried out by examining a reply to the first request for MAC CRC errors.

19. The method according to claim 13, wherein the processor comprises a programmed processor.

20. A set-top box, comprising:

a high speed modem;

a comparatively lower speed modem;

a programmed processor controlling operation of the set-top box including the high speed modem and the comparatively lower speed lower speed modem;

program means, running on the programmed processor, for:

transmitting a first request from the lower speed modem, the request including an IP address for the lower speed modem as a source address;

determining that a reply to the first request is greater in size than a threshold size; and transmitting a second request from the lower speed modem using an IP address of the high speed modem for the source address.

21. The apparatus according to claim 20, further comprising means for receiving a reply to the second request over the high speed modem.

22. The apparatus according to claim 20, wherein the high speed modem comprises a DOCSIS cable modem.

23. The apparatus according to claim 20, wherein the lower speed modem comprises an out-of-band modem.

24. A set-top box, comprising:

a high speed modem;

a comparatively lower speed modem;

a programmed processor controlling operation of the set-top box including the high speed modem and the comparatively lower speed lower speed modem;

program means, running on the programmed processor, for:

transmitting a first request from the lower speed modem, the request including an IP address for the lower speed modem as a source address;

determining that a communication channel used by the lower speed modem is noisy; and transmitting a second request from the lower speed modem using an IP address of the high speed modem for the source address.

25. The apparatus according to claim 24, further comprising receiving a reply to the second request over the high speed modem.

26. The apparatus according to claim 24, wherein the high speed modem comprises a DOCSIS cable modem.

27. The apparatus according to claim 24, wherein the lower speed modem comprises an out-of-band modem.

28. The apparatus according to claim 24, wherein the program means for determining that the communication channel used by the lower speed modem is noisy comprises program means for examining a reply to the first request for IP checksum for errors.

29. The apparatus according to claim 24, wherein the program means for determining that the communication channel used by the lower speed modem is noisy comprises program means for examining a reply to the first request for MAC CRC errors.

30. A set-top box, comprising:

a high speed modem;

a comparatively lower speed modem;

a programmed processor controlling operation of the set-top box including the high speed modem and the comparatively lower speed modem;

program means, running on the programmed processor, for:

transmitting a first request from the high speed modem, the request including an IP address for the high speed modem as a source address;

determining that a communication channel used by the high speed modem is noisy; and transmitting a second request from the high speed modem using an IP address of the lower speed modem for the source address.

31. The apparatus according to claim 30, further comprising means for receiving a reply to the second request over the lower speed modem.

32. The apparatus according to claim 30, wherein the high speed modem comprises a DOCSIS cable modem.

33. The apparatus according to claim 30, wherein the lower speed modem comprises an out-of-band modem.

34. The method according to claim 30, wherein the program means for determining that the communication channel used by the high speed modem is noisy comprises means for examining a reply to the first request for IP checksum for errors.

35. The apparatus according to claim 30, wherein the program means for determining that the communication channel used by the high speed modem is noisy comprises program means for examining a reply to the first request for MAC CRC errors.

36. A set-top box, comprising:

a high speed DOCSIS cable modem;

a comparatively lower speed out-of-band modem;

a programmed processor controlling operation of the set-top box including the high speed DOCSIS cable modem and the comparatively lower speed out-of-band modem;

program means, running on the programmed processor, for:

determining if a request is originating from the DOCSIS cable modem;

if the request is from the DOCSIS cable modem, determining if the DOCSIS cable modem's downstream communication channel is noisy by examining errors received on the downstream communication channel;

if the downstream communication channel is not noisy, transmitting a request over the DOCSIS cable modem using the DOCSIS cable modem's IP address as the source address;

if the downstream communication channel is noisy, transmitting a request over the DOCSIS cable modem using the out-of-band modem's IP address as the source address;

if the request is not from the DOCSIS cable modem, determining that the request is from the out-of-band modem and determining if a reply that is larger than a threshold size is expected;

if a reply that is larger then a threshold size is expected, transmitting a request over the out-of-band modem using the DOCSIS cable modem's IP address as the source address;

if a reply that is larger than a threshold size is not expected determining if the out-of-band modem's return channel is noisy by examining errors received on the out-of-band modem's return channel;

if the out-of-band modem's return channel is noisy, transmitting a request over the out-of-band modem using the DOCSIS cable modem's IP address as the source address; and if the out-of-band modem's return channel is not noisy, transmitting a request over the out-of-band modem using the out-of-band modem's IP address as the source address.

37. The apparatus according to claim 36, wherein if the request is transmitted using the out-of-band modem's IP address as the source address, further comprises receiving a reply over the out-of-band modem; and wherein if the request is transmitted using the DOCSIS cable modem's IP address as the source address, further comprises receiving a reply over the DOCSIS cable modem.

38. An electronic storage medium carrying instructions which, when executed on a programmed processor within a set-top box having a high speed modem and a comparatively lower speed modem, carry out a process comprising the steps of:

transmitting a first request from the lower speed modem, the request including an IP address for the lower speed modem as a source address;

determining by the processor that a reply to the first request is greater in size than a threshold size; and transmitting a second request from the lower speed modem using an IP address of the high speed modem for the source address.

39. An electronic storage medium carrying instructions which, when executed on a programmed processor within a set-top box having a high speed modem and a comparatively lower speed modem, carry out a process comprising the steps of:

transmitting a first request from the lower speed modem, the request including an IP address for the lower speed modem as a source address;

determining by the processor that a communication channel used by the lower speed modem is noisy; and transmitting a second request from the lower speed modem using an IP address of the high speed modem for the source address.

40. The electronic storage medium according to claim 39, wherein determining that the communication channel used by the lower speed modem is noisy is carried out by examining a reply to the first request for IP checksum for errors.

41. The electronic storage medium according to claim 39, wherein determining that the communication channel used by the lower speed modem is noisy is carried out by examining a reply to the first request for MAC CRC errors.

42. An electronic storage medium carrying instructions which, when executed on a programmed processor within a set-top box having a high speed modem and a comparatively lower speed modem, carry out a process comprising the steps of:

transmitting a first request from the high speed modem, the request including an IP address for the high speed modem as a source address;

determining by the processor that a communication channel used by the high speed modem is noisy, and transmitting a second request from the high speed modem using an IP address of the lower speed modem for the source address.

43. The electronic; storage medium according to claim 42, wherein determining that the communication channel used by the high speed modem is noisy is carried out by examining a reply to the first request for IP checksum for errors.

44. The electronic storage medium according to claim 42, wherein determining that the communication channel used by the high speed modem is noisy is carried out by examining a reply to the first request for MAC CRC errors.

45. An electronic communication transport medium carrying instructions which, when executed on a programmed processor within a set-top box having a high speed modem and a comparatively lower speed modem, carry out a process comprising the steps of:

transmitting a first request from the lower speed modem, the request including an IP address for the lower speed modem as a source address;

determining by the processor that a reply to the first request is greater in size than a threshold size; and transmitting a second request from the lower speed modem using an IP address of the high speed modem for the source address.

46. An electronic communication transport medium carrying instructions which, when exerted on a programmed processor within a set-top box having a high speed modem and a comparatively lower speed modem, carry out a process comprising the steps of:

transmitting a first request from the lower speed modem, the request including an IP address for the lower speed modem as a source address;

determining by the processor that a communication channel used by the lower speed modem is noisy; and transmitting a second request from the lower speed modem using an IP address of the high speed modem for the source address.

47. The electronic communication transport medium according to claim 46, wherein determining that the communication channel used by the lower speed modem is noisy is cared out by examining a reply to the first request for IP checksum for errors.

48. The electronic communication transport medium according to claim 46, wherein determining that the communication channel used by the lower speed modem is noisy is carried out by examining a reply to the first request for MAC CRC errors.

49. An electronic communication transport medium carrying instructions which, when executed on a programmed processor within a set-top box having a high speed modem and a comparatively lower speed modem, carry out a process comprising the steps of:

transmitting a first request from the high speed modem, the request including an IP address for the high speed modem as a source address;

determining by the processor that a communication channel used by the high speed modem is noisy; and transmitting a second request from the high speed modem using an IP address of the lower speed modem for the source address.

50. The electronic communication transport medium according to claim 49, wherein determining that the communication channel used by the high speed modem is noisy is carried out by examining a reply to the first request for IP checksum for errors.

51. The electronic communication transport medium according to claim 49, wherein determining that the communication channel used by the high speed modem is noisy is carried out by examining a reply to the first request for MAC CRC errors.

* * * * *